Nov. 4, 1930.   L. E. WILLIAMS   1,780,775
DUMP BODY VEHICLE
Filed April 27, 1927    2 Sheets-Sheet 1
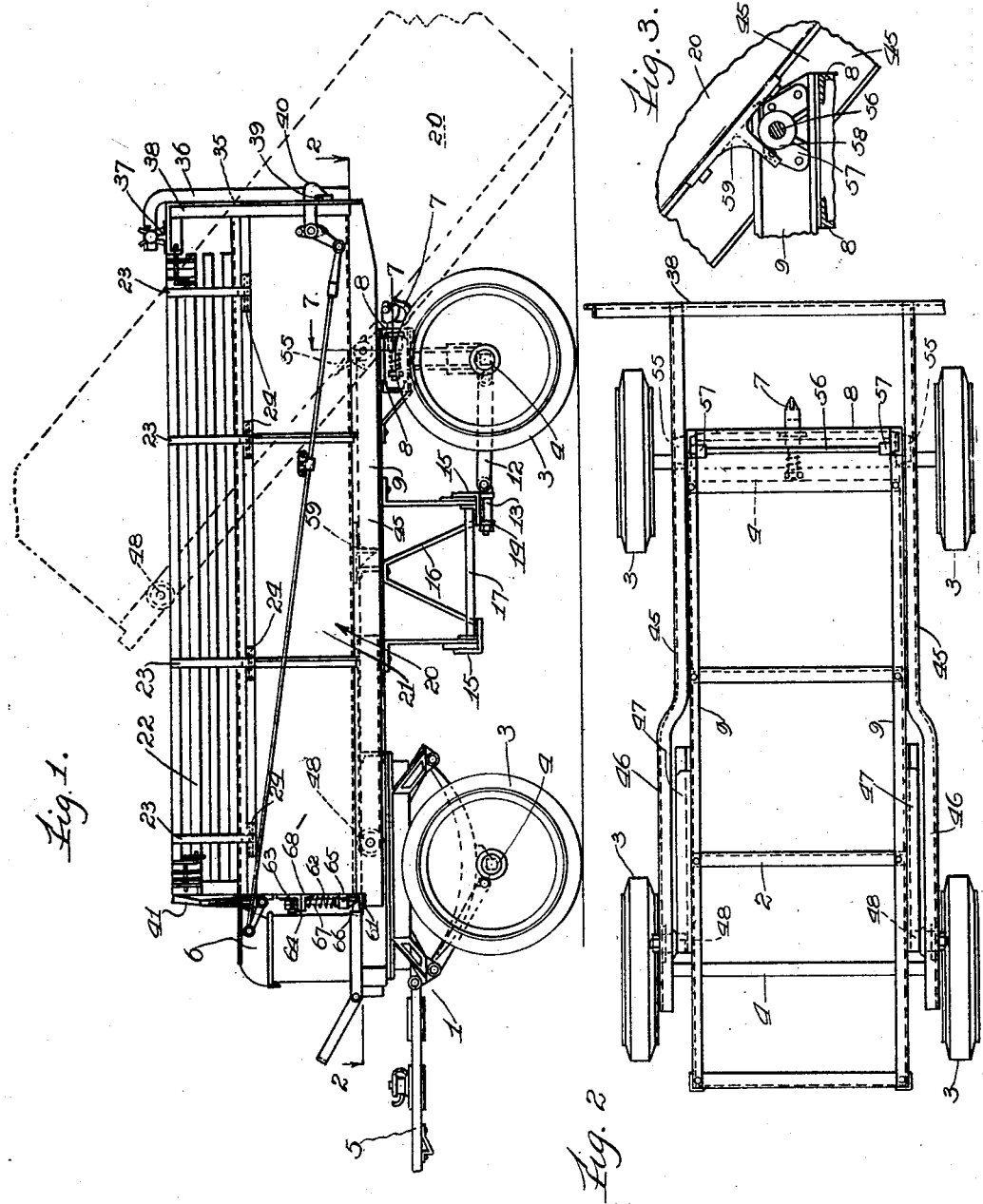
Inventor.
Leroy E. Williams.
by his Attorneys.

Nov. 4, 1930.  L. E. WILLIAMS  1,780,775
DUMP BODY VEHICLE
Filed April 27, 1927   2 Sheets-Sheet 2
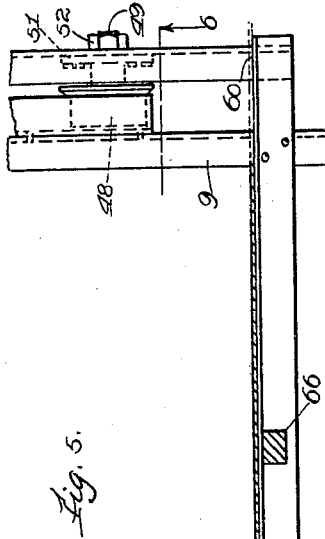
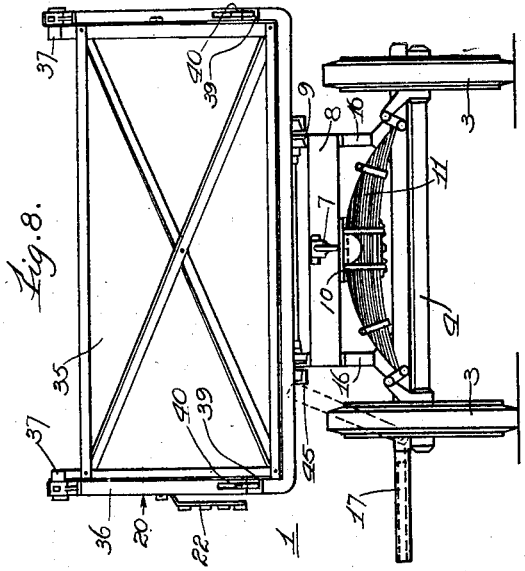
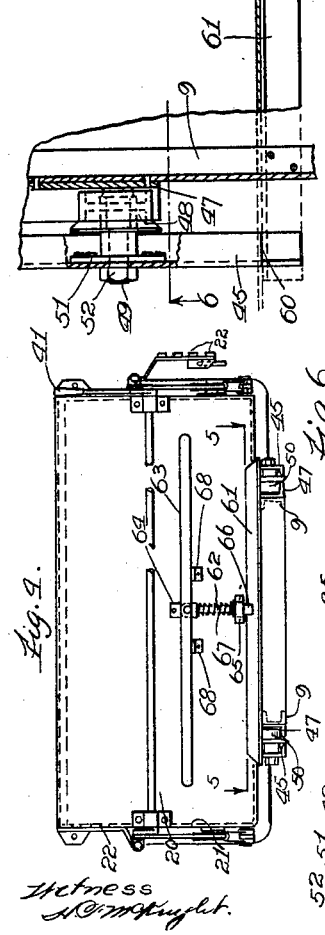
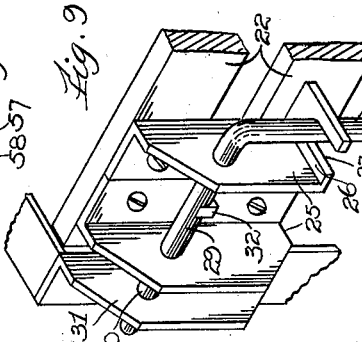
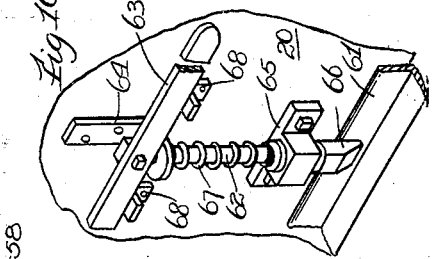
Inventor.
Leroy E. Williams.
by his Attorneys.

Patented Nov. 4, 1930

1,780,775

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

DUMP-BODY VEHICLE

Application filed April 27, 1927. Serial No. 186,837.

This invention relates to dump body vehicles and more particularly to the tilting body type, and has for its object to provide an improved construction for tilting the body in a rearwardly direction. It consists in certain features and elements of construction in combination as herein shown and described, and as indicated by the claims.

In the drawings:

Figure 1 is a side elevation of the vehicle with dump body in loading position; the body is indicated by dotted lines, in a dumping position;

Figure 2 is a transverse horizontal section through the vehicle taken on line 2—2 Figure 1, illustrating diagrammatically the relation of the movable and stationary frames of the vehicle, with certain features of construction omitted.

Figure 3 is a fragmentary detail section showing the pivotal stop arrangement for tilting the body on the vehicle frame, the body being indicated in a tilted position.

Figure 4 is a front end view of the body illustrating a spring catch for securing the body to the stationary frame.

Figure 5 is a horizontal section through the forward end of the body, taken on lines 5—5 on Figure 4 with parts broken away, showing a portion of the guide frame of the body with rollers engaging the stationary frame of the vehicle.

Figure 6 is a vertical transverse section through the forward end of the body and frames, taken on line 6—6, on Figure 5.

Figure 7 is a vertical transverse section through the body and frame taken rearward of the rear roller axle on line 7—7, Figure 1.

Figure 8 is a rear end view of the vehicle embodying this invention, showing the upper portion of a side of the body in a lowered position together with a step in position on the side of the body intermediate the wheels.

Figure 9 is a perspective detail view of the locking arrangement for holding the upper slatted portion of the side of the body, in an upright position.

Figure 10 is a perspective detail view of the locking mechanism on the front end of the body for securing the same in load-carrying position on the vehicle frame.

In the drawings, a vehicle is indicated generally at 1, provided with a stationary frame, 2, mounted on the usual supporting wheels, 3, and axles, 4. The front wheels are mounted to provide steering movement for the vehicle. They are connected with a draw bar, 5, arranged to permit the vehicle to be drawn by either a motor truck, tractor or team of horses, as may be convenient. A seat, 6, is mounted on the forward end of the stationary frame, 2, for use when the vehicle is horse drawn. Adjacent the center of the rear end of the frame, 2, is mounted a coupling pintle hook 7, for connecting to a draw bar of another vehicle for pulling the same in a train. This coupling is of standard construction and need not be herein described, except to point out that it is secured to a pair of transversely extending channel members, 8, which are secured to the lower flanges of a pair of spaced, longitudinally extending channel members, 9, which form a part of the stationary frame, 2. The lower flanges of channels, 8, are connected together by a plate, 10, to provide support for a semi-elliptical spring, 11, extending above and in alignment with the rear axle. A pair of radius rods, 12, are pivotally connected to the rear axle, 4, and extend forwardly and have their outer ends pivotally connected with an eye bolt 13, which is carried by a bracket, 14, secured to the underside of a cross support angle, 15. These radius rods hold the rear axle in proper relation to the vehicle frame, 2. A pair of W shaped structural brackets, 16, are attached to the underside of the frame channels, 9, intermediate the wheels; said brackets are tied together by cross angles, 15, secured to the bottom of the brackets. The angles, 15, extend at one side beyond the bracket, 16, to provide support for a step, 17, which is pivoted between said angles. This step is foldable upwardly out of the way, as indicated by dotted lines in Figure 8. The vehicle body as indicated in the drawings at, 20, may be entirely of sheet metal construction, but for purpose of illustration, the lower portion, 21, of the body is shown of metal construction, the upper portion, 22, being of slat construction. The slats extend longitudinally, and are fixed in spaced relation by upright braces, 23, which are hinged at their lower ends, at 24, to the upper edges of the metal sides, 21. The entire slat portion of either side may be dropped down along the lower side portion, 21, as shown in Figures 4 and 8. The drop side portion permits easier and quicker loading of the body and avoids the necessity of hoisting the material over the extreme upper edge of the body. Together with the side step, 17, it permits one to note the filling of the body, and also affords easy access thereto.

The drop side portion or slatted section, may be quickly secured in an upright position by locking mechanism at the ends thereof. This mechanism comprises a pair of clips, 25, secured to the upper slats, adjacent the ends. The innermost clip has the lower end bent rearwardly to form an ear, 26, having a slot 27, therein for receiving the handle portion, 28 of the locking pin, 29, which extends slidably through the clips and is adapted to engage in aperture, 30, of a clip 31, attached to the upper end of the body, as shown in Figure 9. The pin is provided with a stop lug, 32, intermediate the clips, 25, so as to limit the sliding movement of the pin in and out of aperture, 30. When the pin locks the slat portion to the body, the handle 28, by its own weight, will fall downwardly and engage in slot, 27, out of the way, at the same time holding the pin in place.

The rear end of the body forms a tail gate 35, through which the material may be discharged. This gate is preferably of plate and angle construction for rigidity. The lateral edges of the gate are provided with upwardly extending arms, 36, the upper ends being bent forwardly and pivotally supported in brackets, 37, carried by a pair of upright body supports, 38, at a distance forward of the rear end. The point of pivot or hinge being forward of the gate proper, permits the gate to tend to close itself by its own weight, due to its being hung out of plumb. The gate may be permanently held in closed position by a pair of lugs, 39, projecting at the lateral edges of the gate and engageable by catches, 40, pivoted on the side walls and operable by a hand lever, 41, near the driver's seat.

The under side of the body has attached thereto a pair of longitudinally extending channel members, 45, spaced at a distance outwardly of frame channels, 9. The forward ends of channel members, 45, are bent outwardly at 46, so as to clear the short guide channels, 47, which are secured to the webs of the frame channels, 9, at the forward portions. The entire body is adapted to be rolled over the stationary frame on rollers, engaging between the flanges of the channel members 45 and 47, as will now be described.

It will be clear from Figures 6 and 7 that the construction of guides and roller supports is such as to permit the entire body together with its channel members, 45, to be rolled back or forward without interference with the stationary frame 2. The forward end of the body is carried on a pair of flanged rollers, 48, bearing in and guided by the flanges of the guide channels, 47. Each roller is mounted on a pin, 49, the head, 50, thereof abutting against the tread side of the roller, the other end extending through bearings, 51, and projecting through the web of body channels, 45, and secured thereat by a nut, 52. The bearings 51, are attached to the inner web of the channels, 45, and take the downward load of the body transmitted by the rollers. The flanges on said rollers will be guided by the edges of the flanges of the guide channels, 47, and thereby keep the body in alignment with the vehicle frame and prevent side sway of the body.

The body is supported at the rear end by a pair of rollers, 55, bearing in and guiding the flanges of the channel members, 45, of the body. Said rollers are fixed on the outer ends of a transversely extending shaft, 56, which is carried by bearings, 57, secured to the inside of the webs of frame channels, 9, adjacent the rear ends thereof. As may be seen from Figure 7, said rollers, 55, are of a diameter to raise the body floor high enough to avoid interference with the frame, 2. The bearings, 57, are provided with inwardly extending bearing bosses, 58. A pair of bumper brackets, or stops, 59, are attached to the underside of the body in approximate mid-position in longitudinal alignment with the bearing sleeves, 58. As the body is rolled rearwardly, the brackets strike the bosses, 58, and bear thereagainst for pivoting of the body about the rear roller axis during dumping operations.

Before the body is rolled rearwardly, preparatory to dumping, the latches, 39, are released to permit the tail gate, 35, to swing free to discharge while the body is being tilted. The body is rolled rearwardly, horizontally until the front rollers, 48, pass beyond the flanges of the guide channels, 47, at which time the pivot brackets 59, engage the bearing bosses, 58, the weight of the body and load being unbalanced, tilts the body about the rear roller axis, until the lower rear end of the body strikes the ground. During the tilting movement of the body, the tail-gate gradually discharges the material until the body is emptied. After the body is completely emptied, the rear end is manually raised about the pivot axis and is again rolled forwardly, with the front rollers again engaging between the flanges of the guide channels, 47.

The body may be held in place on the stationary frame by any suitable means. As shown, the body channels, 45, are notched at their forward ends at 60, so as to pass beneath a cross angle iron, 61, which is attached to the upper flanges of the channels, 9, of the frame. In addition, the body is held in position by a locking mechanism comprising a downwardly extending lock pin, 62, whose upper end is pivoted to an operating lever, 63, which extends across the front end of the body. The pin is supported by a bracket, 64, secured to the body, and is guided at its lower end in a second bracket, 65, also secured to the body. The lower end of the pin is flared to provide a head, 66, the outer surface of which is beveled to permit said pin to be forced upwardly as the beveled face is gradually forced against the upper edge of the cross angle 61, in the forward movement of the body. A spring 67 is coiled about said pin, having its ends abutting against a shoulder of the head, 66, and against the underside of the bracket, 64, so as to yieldingly force the pin toward its lowermost limit, as the head passes over the edge of said cross angle, 61, and engages the front surface of said angle. The lock may be released by pulling down or pushing up on either end of a double-acting operating lever, 63, which fulcrums on opposite sides of the pin, on clips, 68, attached to the body.

I claim:

1. In a dumping vehicle, the combination of a vehicle frame or chassis having straight parallel side members with rollers journalled at the rear ends of said members and projecting from their outer faces, and with outwardly open guide channels secured to their forward portions; a body with longitudinal frame members comprising forward portions spaced laterally from the chassis side members to accommodate said guide channels and rearward portions offset inwardly from the forward portions to extend closely adjacent said chassis members, said rearward portions being inwardly facing channels engaged with the said rollers in the chassis and the forward portions carrying inwardly extending rollers engaged in the outwardly facing guide channels, said channels terminating rearwardly at a point to release said rollers when the body has rolled back to a position for tilting about the rollers at the rear of the vehicle frame.

2. In the combination defined in claim 1, said relatively offset forward and rear portions of each longitudinal body frame member being integral parts of a continuous member bent to produce the offset relation.

LEROY E. WILLIAMS.